United States Patent [19]
Gonze et al.

[11] Patent Number: 5,976,582
[45] Date of Patent: Nov. 2, 1999

[54] METHOD FOR COATING A FOODSTUFF AND PRODUCT THEREOF

[75] Inventors: Michel Henri Andrë Gonze, Bruxelles; Freddy Maurits Luc Van Der Schueren, Aalst, both of Belgium

[73] Assignee: Cerestar Holding B.V., LA Sas van Gent, Netherlands

[21] Appl. No.: 08/896,672

[22] Filed: Jul. 18, 1997

[30] Foreign Application Priority Data

Jul. 20, 1996 [GB] United Kingdom .................. 9615283

[51] Int. Cl.⁶ .............. A23G 3/30; A23G 3/32; A23L 1/36
[52] U.S. Cl. ................. 426/5; 426/632; 426/660
[58] Field of Search .................. 426/3, 5, 661, 426/578, 632, 660

[56] References Cited

U.S. PATENT DOCUMENTS

| | | |
|---|---|---|
| 3,427,951 | 2/1969 | Mitan et al. . |
| 3,870,527 | 3/1975 | Kryger et al. .............................. 106/2 |
| 3,956,515 | 5/1976 | Moore et al. ............................ 426/302 |
| 4,786,511 | 11/1988 | Huzinec et al. ............................ 426/5 |
| 4,837,314 | 6/1989 | Eastman .................... 536/111 |
| 5,569,480 | 10/1996 | De Conineu et al. .............. 426/578 X |
| 5,711,975 | 1/1998 | Gonze et al. ................................ 426/3 |

FOREIGN PATENT DOCUMENTS

| | | |
|---|---|---|
| 892 322 | 9/1982 | Belgium . |
| 547 551 | 6/1993 | European Pat. Off. . |
| 679 340 | 11/1995 | European Pat. Off. . |

OTHER PUBLICATIONS

Database WPI, Section Ch, Derwent Publication Ltd., London,GB; ClassA97, AN 73–30031U, XP002023922 & JP 48 015 672 B.

Food Technology, vol. 21, No. 8, 1967, Chicago US, pp. 1064–1066 L.Jokay et al.

*Primary Examiner*—Arthur L. Corbin
*Attorney, Agent, or Firm*—Pillsbury Madison & Sutro LLP

[57] ABSTRACT

The present invention describes a method for precoating of oil containing foodstuff such as chewing gum, nuts, almonds and caramels. The present invention also discloses a composition for the application in the method and foodstuffs coated with this composition. The precoating composition contains thinned hydroxypropylated starch, preferably tapioca starch, which can be used in relatively high concentration necessitating the application of only a limited number of layers.

6 Claims, 1 Drawing Sheet

METHOD FOR COATING A FOODSTUFF AND PRODUCT THEREOF

TECHNICAL FIELD

The present invention relates to the precoating or coating of oil-containing centers such as chewing gum, nuts, almonds and caramels. The present invention relates to a method for obtaining a coating or precoating and also to a composition for the application in the said method.

BACKGROUND OF THE INVENTION

Chewing gums consist of a center which contains the actual gum material and a coating. The coating may comprise different components. The coating serves to protect the gum from influences of the environment i.e. temperature, humidity. The coating consists of different layers of products and includes sucrose, colourants, flavours and other additives the coating also contains polyols such as sorbitol, xylitol and erythritol in so-called sugar-free chewing gums.

When centers are used which contain oil or fat it is advisable to seal in the oil or fat with some layers of arabic gum or another film forming substance. Unless this is done the oil or fat may eventually soak through the final coating resulting in unsightly dark patches.

It has been found that coating of the centers may be difficult to achieve depending on the composition of the center. The coating material does not adhere to the center if the material contains too much oil or fat.

In order to overcome this problem it was found that a precoating was very useful. In general precoatings are applied to the centers in from 5 to 10 layers depending on the composition of the centers and of the precoating material. The idea behind this is that precoating material fills up the pores and forms a thin protective film around the center which adheres much better to the coating material.

Materials which have been found to be suitable as precoating materials are arabic gum, gelatine and tapioca dextrins. Due to its properties arabic gum is often difficult to handle. To solubilise the gum arabic the crude lumps have to be ground and the resulting solution has to be cleared afterwards. This process may take up to 24 hours. A disadvantage of these precoating materials is that at relatively low concentration suspensions of these products already have a high viscosity. With high viscosity suspensions it is difficult to coat a product. This necessitates the use of diluted coating suspension which in turn results in the need to apply more layers of coating which makes the coating process much longer.

Other materials which are used for coating of foodstuffs have been described for example Jokay et al. (Food Technol. 21 1064–1066 (1967)) describe the use of thin boiling hydroxypropyl high amylose (70%) starch as a coating material. High amylose starches are known to be subject to retrogradation. These starches also aid in quick setting and drying of the film.

U.S. Pat. No. 3,870,527 relates to the use granular starch based gums to replace gum arabic in lithographic applications. Although use in food applications is mentioned in general the coating or precoating of oil-containing foodstuffs is not mentioned. U.S. Pat. No. 4,837,314 relates to the preparation of cold water soluble etherified or esterified starch derivatives which are particularly suited for use in wall covering adhesive formulations and as protective colloids in emulsion polymerisation processes.

European patent application EP 547 551 relates to the use of edible films and compositions to obtain such films. The compositions contain starch, gelatin, plasticizer, lipid and water.

SUMMARY OF THE INVENTION

The present invention describes the use of thinned hydroxypropylated starches as coating or precoating composition. The thinned hydroxypropylated starch is used in precoating of chewing gum, nuts and other foodstuffs. The preferred starch is starch obtained from tapioca.

The present invention discloses a composition for coating or precoating oil-containing foodstuffs consisting of water and thinned hydroxypropylated tapioca starch.

The present invention also describes a method for the application of thinned hydroxypropylated tapioca starches to foodstuffs for example chewing gum centers. The process of the present invention makes possible the effective coating of the material with a limited number of layers. The method for coating oil-containing or fatty foodstuffs comprises the following steps:

preparing a dispersion of 5 to 60% (dw) of thinned hydroxypropylated tapioca starch in water and keeping this dispersion at a temperature between 30 and 50° C., keeping the foodstuff to be coated in a rotating or shaking pan at room temperature, adding an amount of 0.1% to 5% (based on the dry weight of the starch) of the thinned hydroxypropylated tapioca starch dispersion to the pan, continuing the rotation or shaking until an even layer has been formed, repeating the addition until a desired amount of coating layers is obtained, cooling and packaging the coated foodstuff.

Furthermore, the invention discloses food products which have been coated or precoated with the mentioned starch. The preferred starch is thinned hydroxypropylated tapioca starch.

DETAILED DESCRIPTION OF THE INVENTION

Figure 1:
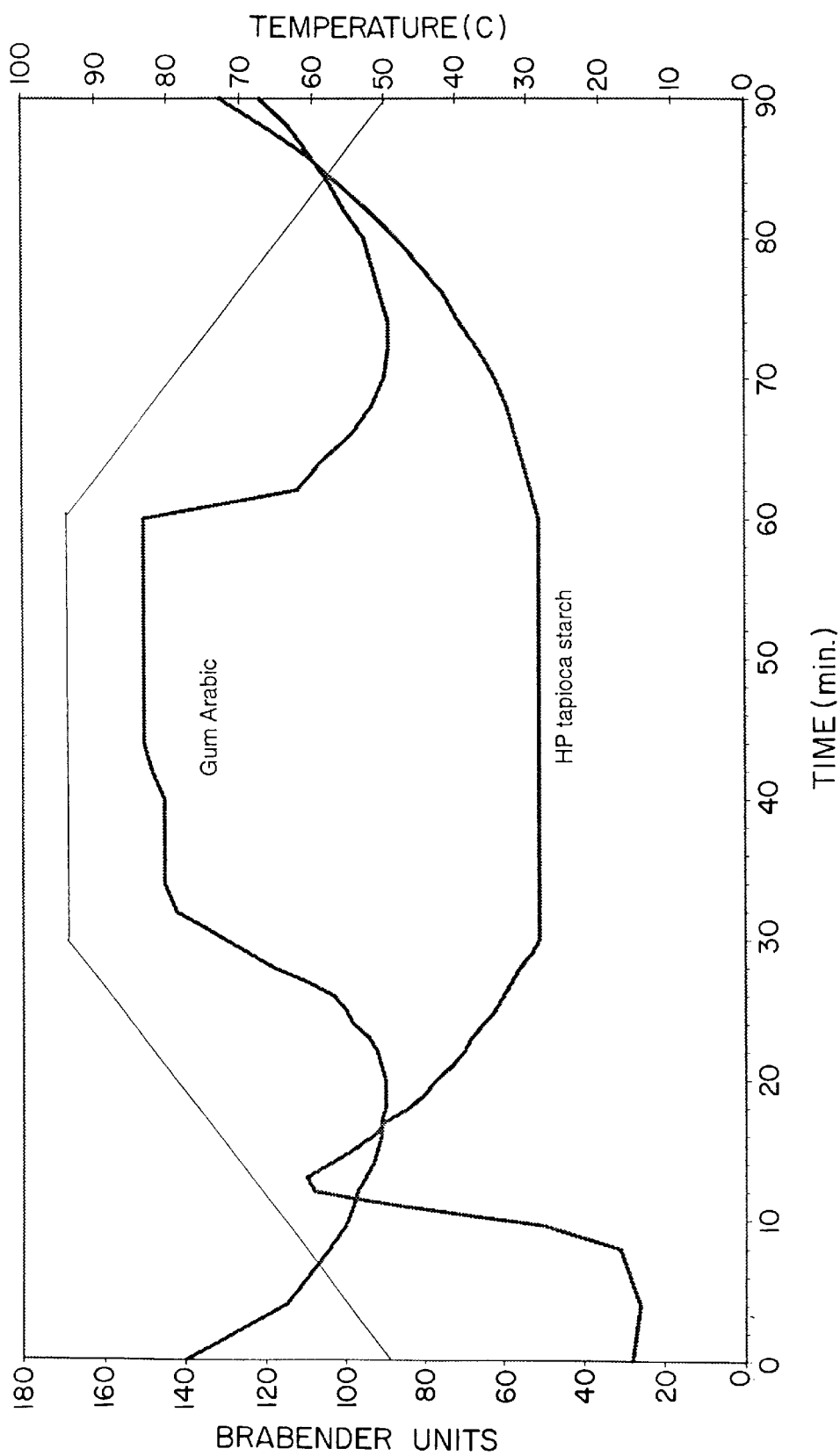
FIG. 1 shows a comparison of the Brabender viscographs of gum arabic and thinned hydropropylated (HP) tapioca starch.

The present invention describes the use of thinned hydroxypropylated starch as precoating or coating composition. A preferred starch is obtained from tapioca. The hydroxypropylated starch component of the composition according to the invention may have a DS (degree of substitution) in the range 0.05 to 0.2, preferably 0.08 to 0.15 particularly 0.1 to 0.12. It is also possible, although not necessary, for substituents other than hydroxypropyl to be present in the starch molecule eg. acetate groups. When the hydroxypropylated starch is thinned, thinning may be achieved in a known manner by acid treatment, enzyme treatment or by extrusion with or without the addition of acid. Suitably the hydroxypropylated starch is thinned so that a 30% by weight aqueous mixture has a Brabender peak viscosity of about 150 Brabender Units. The thinned hyrdoxypropylated starch may be ungelatinised as when acid thinned or gelatinised as when enzymatically thinned. In the latter case the thinned starch may be spray-dried.

The application of the process and product according to the present invention is exemplified as follows. A solution containing from 5 to 60% (dw) of acid thinned hydroxypylated tapioca starch is prepared. The starch is dispersed in water by using a high and/or low speed mixer and heating to a temperature of 25–70° C. The starch solution is kept at a desired temperature before the coating process is started preferably the temperature is between 30–50° C.

The nuts, centers (if chewing gum is coated) or other foodstuff are kept in a rotating or shaking pan at room temperature. To the material to be coated is added an amount of 0.1% to 5% (based on the dry weight of the starch) of starch material. The coating is allowed to continue until an even layer has been formed. The coating process is repeated until the desired number of layers has been formed. Between the application of each layer the centers are revolved under gentle heat with dry air blowing until the starch is distributed evenly on the centers. To complete the sealing process it is possible to sprinkle wheat flour onto the product surface.

Since the viscosity of the acid thinned hydroxypropylated tapioca starch is low even at a reasonably high concentration the total amount of material applied in a single layer is much higher than when known precoating compositions are used. A total number of 3 to 5 layers applied in this way is considered as sufficient for the precoating of chewing gum centers. This results in a considerable reduction of the coating time. FIG. 1 illustrates this point. Comparison of the Brabender viscographs of gum arabic and thinned hydropropylated (HP) tapioca starch (both at 30% w/w) shows that the viscosity of the HP tapioca starch is much lower. Application of the coating can therefore be performed at much higher concentration when HP tapioca starch is used than when gum arabic is used. Thus the number of layers applied can be much lower. After cooling of the compositions it can be seen from FIG. 1 that the viscosity of gum arabic and HP tapioca starch is the same. Thus under actual use conditions gum arabic can be replaced by thinned hydroxypropylated tapioca starch.

The coated material can further be stored at room temperature and if needed can be further coated in a similar manner. For chewing gum the precoated centers were stored at room temperature for 5 hours before the coating procedure was started. The coating of the present invention is particularly useful when applied to oil-containing or fatty foodstuffs. In general these are foodstuffs like chewing gum, nuts and almonds. The coating serves to enclose the fat or oil so that the material is less sticky. The precoated material also allows for a further coating which will then retain its glossy structure. The effect of the precoating being that the outer material is not influenced by oil or fat coming from the inside. As such the precoating serves to replace gum arabic.

It was found that the thinned hydroxypropylated tapioca starch mimics the functional properties of gum arabic, matching its key attributes i.e. film clarity, neutral taste, flexible texture and solubility. However, the mentioned starch has also some advantages in the ease of handling, constant availability and higher solubility. Moreover, the coating composition may only contain water and thinned hydroxypropylated tapioca starch, no other ingredients being required.

The chewing gum centers precoated according to the present invention were subsequently coated with sorbitol and/or xylitol.

The precoating material of the present invention makes possible a further coating on relatively oily or fatty centers.

EXAMPLE 1

A solution containing 30% (dw) of acid thinned hydroxypropylated tapioca starch was prepared. The starch was dispersed in the water by using a high and/or low speed mixer and heating to a temperature of 60–70° C. The starch solution was kept at 40–50° C. To 2 kg of centers an amount of 0.5% (10 g) of the weight of the centers of suspended starch was added. The addition was performed under constant mixing, mixing was continued for 2 minutes and without heating before the next addition. The speed of the pan was 20 rpm. A total of 5 layers was applied to the centers in this way. The precoated centers were stored at room temperature for 5 hours before the coating procedure was started.

The coating was performed with sorbitol in a known manner and it was found that the coating was effectively bound.

EXAMPLE 2

Example 1 was repeated with different precoating materials.

A comparison was made between crystal gum (tm), gum arabic and acid thinned hydroxypropylated tapioca starch. Hardness of the gums was measured after 1 day, 1 week and 3 weeks storage at 70% relative humidity and 25° C. Tests were performed on centers coated with 5 or 10 layers.

Gum mass hardness was measured according to the following method. Chewing gum centers were cooled to room temperature. A cylindrical plunger with a cross-section of 1 mm was penetrated about 1 mm into the chewing gum mass and the force required to penetrate the coating and the center were measured.

The results are shown in Table 1. It can be seen that the hardness of the precoating and of the center are comparable with that of the precoatings made with gum arabic and crystal gum™.

TABLE I

Coated Products

| | AFTER | | | | | | | | |
|---|---|---|---|---|---|---|---|---|---|
| | 1 day | | | 1 week | | | 3 weeks 70% RH & 25° C. | | |
| Pre-coating with 5 layers | Hardn. Coating | Dist. | Hardn. Center | Hardn. Coating | Dist. | Hardn. Center | Hardn. Coating | Dist. | Hardn. Center |
| Gum arabic | 1932 | 0.717 | 1784 | 2076 | 0.754 | 1783 | 1876 | 0.820 | 1545 |
| at HP tapioca starch* | 2212 | 0.694 | 2072 | 2269 | 0.781 | 1966 | 1708 | 0.793 | 1400 |
| Crystal gum | 2429 | 0.733 | 2038 | 2469 | 0.77 | 2038 | 1880 | 0.759 | 1549 |
| Pre-coating with 10 layers | | | | | | | | | |

TABLE I-continued

Coated Products

| | AFTER | | | | | | | | |
|---|---|---|---|---|---|---|---|---|---|
| | 1 day | | | 1 week | | | 3 weeks 70% RH & 25° C. | | |
| Pre-coating with 5 layers | Hardn. Coating | Dist. | Hardn. Center | Hardn. Coating | Dist. | Hardn. Center | Hardn. Coating | Dist. | Hardn. Center |
| Gum arabic | 2470 | 0.709 | 2199 | 2569 | 0.794 | 2039 | 2257 | 0.786 | 1536 |
| at HP tapioca starch* | 2322 | 0.717 | 2097 | 2645 | 0.804 | 2235 | 2076 | 0.785 | 1704 |

*)acid thinned hydroxypropylated tapioca starch
Hardn. = hardness
Dist. = distance
RH = relative humidity

What we claim is:

1. A oil-containing foodstuff, selected from the group consisting of chewing gum, nuts and caramel, coated or precoated with at least one coating consisting essentially of thinned hydroxypropylated tapioca starch.

2. An oil-containing foodstuff according to claim 1, wherein the coating or precoating consists of 3 to 5 layers.

3. A method for coating an oil-containing foodstuff selected from the group consisting of chewing gum, nuts and caramel comprising:

preparing a dispersion consisting essentially of 5 to 60% (dw) of acid thinned hydroxpropylated tapioca starch in water and keeping this dispersion at a temperature between 30 and 50° C.;

placing the oil-containing foodstuff to be coated in a rotating or shaking pan at room temperature;

adding an amount of 0.1% to 5% (based on the dry weight of the starch) of the thinned hydroxypropylated tapioca starch dispersion to the pan;

continuing the rotating or shaking of the pan until an even coating layer has been formed on the foodstuff;

repeating the addition until a desired amount of coating layers is obtained on the foodstuff; and cooling and packaging the coated oil-containing foodstuff.

4. A method according to claim 3, wherein from 3–5 coating layers are applied as a precoating or coating on said oil-containing foodstuff.

5. A coated foodstuff obtained according to the method of claim 3.

6. A oil-containing foodstuff, selected from the group consisting of chewing gum, nuts and caramel, coated with at least one coating layer formed from ingredients consisting of water and thinned hydroxypropylated tapioca starch.

* * * * *